United States Patent
Barrientos Blanco

(10) Patent No.: US 11,719,290 B2
(45) Date of Patent: Aug. 8, 2023

(54) SYNCHRONIZING RING

(71) Applicant: Ningbo Geely Automobile Research & Development Co., Ltd., Ningbo (CN)

(72) Inventor: Eva Barrientos Blanco, Gothenburg (SE)

(73) Assignee: Ningbo Geely Automobile Research & Development Co., Ltd., Ningbo (CN)

(*) Notice: Subject to any disclaimer, the term of this patent is extended or adjusted under 35 U.S.C. 154(b) by 55 days.

(21) Appl. No.: 17/531,760

(22) Filed: Nov. 21, 2021

(65) Prior Publication Data

US 2022/0082136 A1 Mar. 17, 2022

Related U.S. Application Data

(63) Continuation of application No. PCT/CN2020/094186, filed on Jun. 3, 2020.

(30) Foreign Application Priority Data

Jun. 5, 2019 (EP) ..................................... 19178402

(51) Int. Cl.
F16D 23/06 (2006.01)

(52) U.S. Cl.
CPC ........ *F16D 23/06* (2013.01); *F16D 2023/065* (2013.01); *F16D 2023/0656* (2013.01)

(58) Field of Classification Search
CPC .................................. F16D 23/025–2023/0693
See application file for complete search history.

(56) References Cited

U.S. PATENT DOCUMENTS

| 5,657,844 A * | 8/1997 | Wagner ................... F16D 23/06 |
| | | 192/53.32 |
| 2012/0030929 A1* | 2/2012 | Merklein ............... C21D 1/673 |
| | | 29/592 |
| 2021/0381558 A1* | 12/2021 | Barrientos Blanco ..................... |
| | | F16D 23/025 |

FOREIGN PATENT DOCUMENTS

| CN | 103790994 A | 5/2014 |
| CN | 203836025 U | 9/2014 |
| CN | 105987089 A | 10/2016 |
| DE | 102005007647 A1 | 8/2006 |
| DE | 102007042800 A1 | 3/2009 |
| EP | 3273085 A1 | 1/2018 |
| JP | 2008057729 A | 3/2008 |
| JP | 4593983 B2 | 12/2010 |
| JP | 2012122577 A | 6/2012 |
| JP | 5525425 B2 | 6/2014 |

OTHER PUBLICATIONS

International Search Report from corresponding International Application No. PCT/CN2020/094186, dated Sep. 9, 2020, 3 pages.

* cited by examiner

*Primary Examiner* — David R Morris
(74) *Attorney, Agent, or Firm* — Tucker Ellis LLP

(57) ABSTRACT

A synchronizing ring for a synchronizer of a transmission. The synchronizing ring is provided with a plurality of axially extending cams for engagement with a further synchronizing ring. An axial surface of each axial cam is provided with at least one groove for transportation of oil.

15 Claims, 6 Drawing Sheets

SYNCHRONIZING RING

RELATED APPLICATION DATA

This application is a continuation of International Patent Application No. PCT/CN2020/094186, filed Jun. 3, 2020, which claims the benefit of European Patent Application No. 19178402.4, filed Jun. 5, 2019, the disclosures of which are incorporated herein by reference in their entireties.

TECHNICAL FIELD

The invention relates to a synchronizing ring for a synchronizer of a transmission, which synchronizing ring is provided with a plurality of axially extending cams for engagement with a further synchronizing ring. In addition, the invention relates to a synchronizer for a vehicle transmission which synchronizer comprises such a synchronizing ring.

BACKGROUND

Transmissions usually have synchronizers for shifting gears. For example, an idle gear wheel that is journaled on an output shaft and engaged with a gear wheel arranged on an input shaft, can be connected to the output shaft by a synchronizer. The synchronizer has a sleeve that is brought into engagement with a dog ring of the idle gear wheel by means of teeth. The sleeve is connected to a hub by means of a spline joint. The hub is in turn rotationally locked relative to the output shaft. Thus, when the sleeve and the dog ring are engaged, the idle gear wheel and the output shaft are rotationally locked relative to each other via the synchronizer and torque can be transferred.

When shifting gears, before displacement of the sleeve for engaging the dog ring, the rotation speeds of the idle gear wheel and the sleeve have however to be synchronized.

For this reason, friction rings can be used, and particularly an inner ring can be arranged inside of a blocking ring used for pre-synchronization in a synchronizer. Such an inner ring for a multi-cone synchronizer, has axially extending cams for engagement with the blocking ring. The cams are received by corresponding recesses of the blocking ring.

SUMMARY

An objective of the invention is to provide a synchronizing ring for improving lubrication of the synchronizer.

The objective is achieved by a synchronizing ring for a synchronizer of a transmission, wherein the synchronizing ring is provided with a plurality of axially extending cams for engagement with a further synchronizing ring, and wherein an axial surface of each axial cam is provided with at least one groove for transportation of oil.

The invention is based on the insight that a small gap formed between the axial surfaces of the axial cams of the synchronizing ring and a component such as a hub of the synchronizer, may under unfavourable conditions lead to oil being stuck in the gap and dried oil is sticking on the component. Said at least one groove arranged in the axial cams will eliminate or at least reduce such a problem by providing an improved circulation of oil in the synchronizer.

The axial surface of each axial cam is preferably provided with a plurality of grooves for transportation of oil.

According to one embodiment, each groove has an extension direction in the radial extension direction of the synchronizing ring, and preferably the length of each groove is equal to the extension of the corresponding axial cam in the radial extension direction of the synchronizing ring. Hereby, oil can be transported from the axial surface in an area between an outer radial surface and an inner radial surface of the axial cam, thereby increasing the circulation of oil in the synchronizer.

Each axial cam can have 2-20 grooves, preferably 3-10 grooves and more preferably 4-8 grooves, for drainage of oil from the gap. The cross section area of each groove can be in the interval 0.5-20 mm$^2$, preferably 1-15 mm$^2$ and more preferably 2-10 mm$^2$. For example, the cross-section of each groove can be semi-circular with a diameter in the interval 2-8 mm, preferably 3-6 mm.

The synchronizing ring can be an inner ring to be arranged inside the further synchronizing ring being an external ring. The synchronizing ring can have a conical shape with an outer radial surface for interacting with an intermediate friction ring of the synchronizer.

For example, the synchronizing ring can be an inner ring for a synchronizer which inner ring interacts with an intermediate ring and an external blocking ring of the synchronizer for pre-synchronization when a sleeve is displaced for shifting gears.

The synchronizer can be a multi-cone synchronizer, such as double or triple cone synchronizer.

The features of the invention can be advantageously used when the synchronizing ring has two or more axial cams. The synchronizing ring can have a number of axial cams being a multiple of 3 for instance. The number of axial cams is often in the interval 3-9.

Each axial cam can have two main extension directions; one first main extension direction in the circumferential direction of the synchronizing ring and a second main extension direction in the axial direction of the synchronizing ring. In addition, a third extension direction of the axial cam, i.e. the thickness, is in the radial direction of the synchronizing ring. The axial surface defined by the extension in the circumferential direction and the extension in the radial direction is often arranged with a small gap relative to an axial surface of a synchronizer hub, since the packing space is limited.

Due to the relatively large total area of the axial surfaces of the axial cams, it has been found out that the grooves can improve the lubrication to a significant extent.

According to another aspect of the invention, a further objective is to provide a synchronizer for a vehicle transmission enabling improved lubrication.

This objective is achieved by a synchronizer comprising a synchronizing ring, a component and a further synchronizing ring, wherein the synchronizing ring is provided with a plurality of axially extending cams received by a plurality of recesses of the further synchronizing ring, and wherein an axial surface of each axial cam is provided with at least one groove for transportation of oil from a gap formed between the axial surface of each axial cam and the component.

The advantages of the synchronizer are similar to the advantages already discussed hereinabove with reference to the different embodiments of the synchronizing ring.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
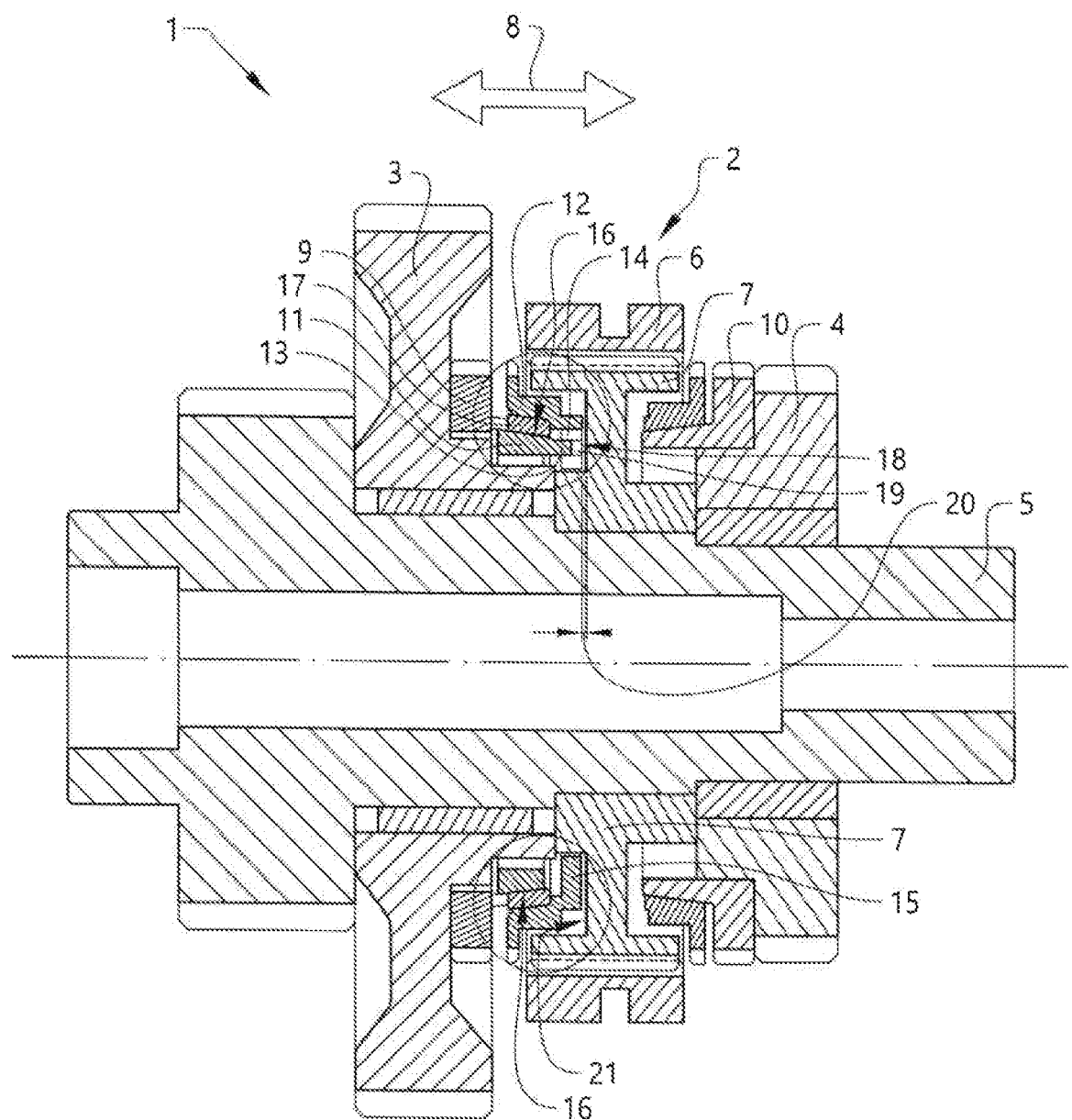
FIG. 1 is a cut view of a synchronizer of a vehicle transmission.

FIG. 1 is a cut view of a transmission 1 having a synchronizer 2. The synchronizer 2 can be used to rotationally lock a first gear wheel 3 and a second gear wheel 4 to a shaft 5 of the transmission 1. For this purpose the synchronizer 2 has a displaceable sleeve 6 arranged on a hub 7. In FIG. 1 the sleeve 6 is positioned in a neutral position. If the sleeve 6 is moved from the neutral position in an axial direction 8 of the synchronizer 2 towards the first gear wheel 3, the sleeve 6 will engage a dog ring 9 of the first gear wheel 3 and thereby lock the first gear wheel 3 to the shaft 5. If instead the sleeve 6 is moved in the axial direction 8 towards the second gear wheel 4, the sleeve 6 will engage a clutch cone ring 10 and thereby lock the second gear wheel 4 to the shaft 5.

The synchronizer 2 comprises a synchronizing ring 11, a component 7 and a further synchronizing ring 12. The synchronizing ring 11 is provided with a plurality of axially extending cams 13. The further synchronizing ring 12 is provided with radially extending cams 15 and corresponding recesses 14 between the cams 15 for receiving the axial cams 13 of the synchronizing ring 11. The synchronizing ring 11 can have a conical shape and be provided with an outer surface 16 for interaction with an intermediate friction ring 17.

An axial surface 18 of each axial cam 13 is provided with at least one, preferably a plurality of grooves 19 for transportation of oil from a gap 20 formed between the axial surface 18 of each cam 13 and the component 7. By axial surface is meant a surface faced in the axial direction 8 or the longitudinal direction of the synchronizing ring 11. Each groove 19 forms a channel for transportation of oil. The component is here the hub 7 on which the sleeve 6 is arranged. The gap 20 is formed between the axial surface 18 of the axial cam 13 and an opposing axial surface 21 of the hub 7. The grooves 19 of the synchronizing ring 11 will be further described hereinafter with reference to further figures. The synchronizing ring 11 is an inner ring arranged inside of the further synchronizing ring 12 being an external blocking ring and inside of the intermediate friction ring 17.

Figure 2A:
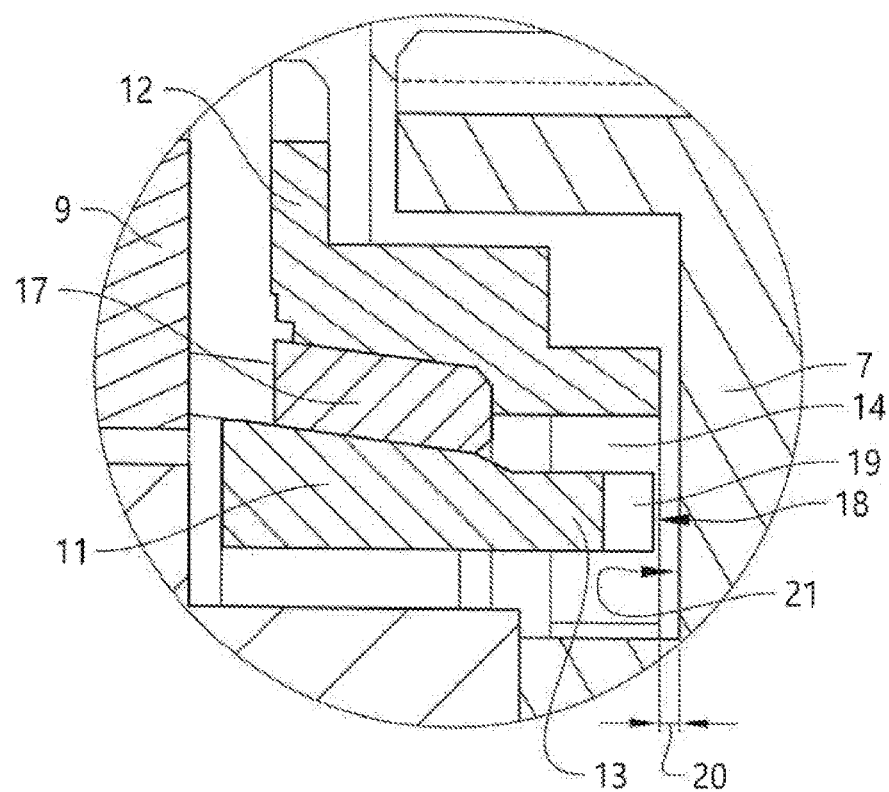
FIG. 2A is an enlarged view of a part of the synchronizer in FIG. 1.
Figure 2B:
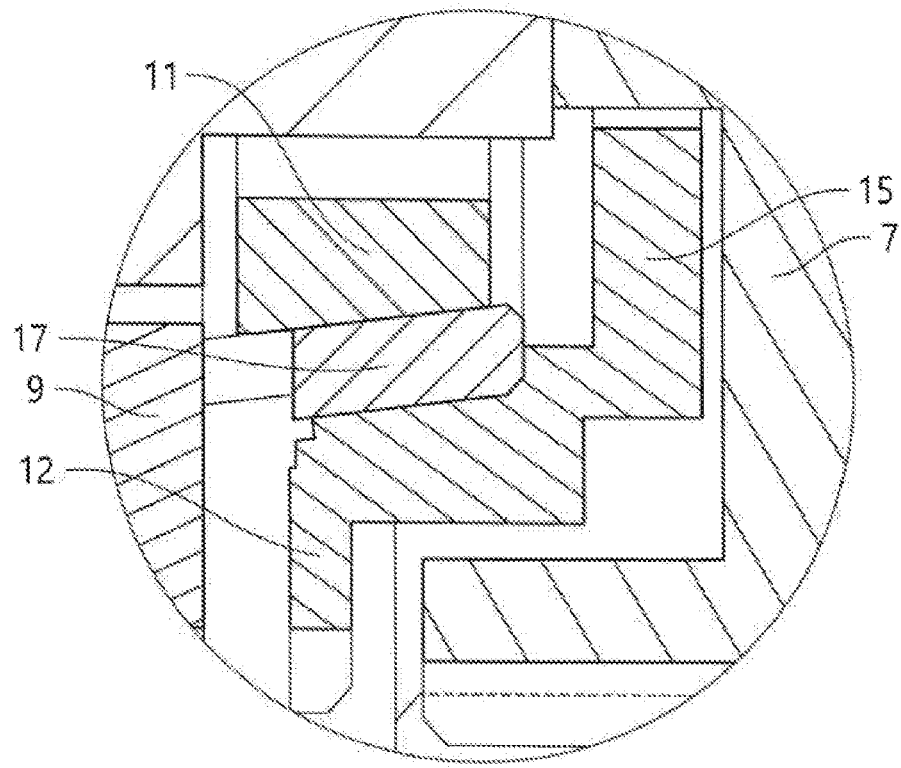
FIG. 2B is an enlarged view of a part of the synchronizer in FIG. 1.

FIGS. 2A and 2B are enlarged views of parts of the synchronizer 2 in FIG. 1. In addition to the dog ring 9 and the hub 7, friction or synchronizing rings are shown. In the example embodiment illustrated in FIG. 1, the synchronizer 2 is a double-cone synchronizer. The synchronizer 2 has the external synchronizing ring 12, the intermediate synchronizing ring 17 and the inner synchronizing ring 11. The external synchronizing ring 12 will also be referred to as the further synchronizing ring 12 or blocking ring. The inner synchronizing ring will also be referred to as the synchronizing ring 11 or inner ring. When the sleeve 6 is initially moved towards the first gear wheel 3, the blocking ring 12 will be contacted by one or more struts (not shown) of the synchronizer 2 for pre-synchronization. Each strut is arranged on the hub 7 and can be displaced in the axial direction 8 relative to the hub 7 together with the sleeve 6 for engagement with the blocking ring 12.

In FIG. 2A, one said axial cam 13 of the inner ring 11 received in one said recess 14 of the blocking ring 12 is illustrated, whereas in FIG. 2B one said radial cam 15 of the blocking ring 12 is illustrated. The axial cam 13 in FIG. 2A is illustrated with one of said plurality of grooves 19 for enabling transportation of oil from the gap 20 formed between the axial surface 18 of the axial cam 13 and the axial surface 21 of the hub 7.

Figure 2C:
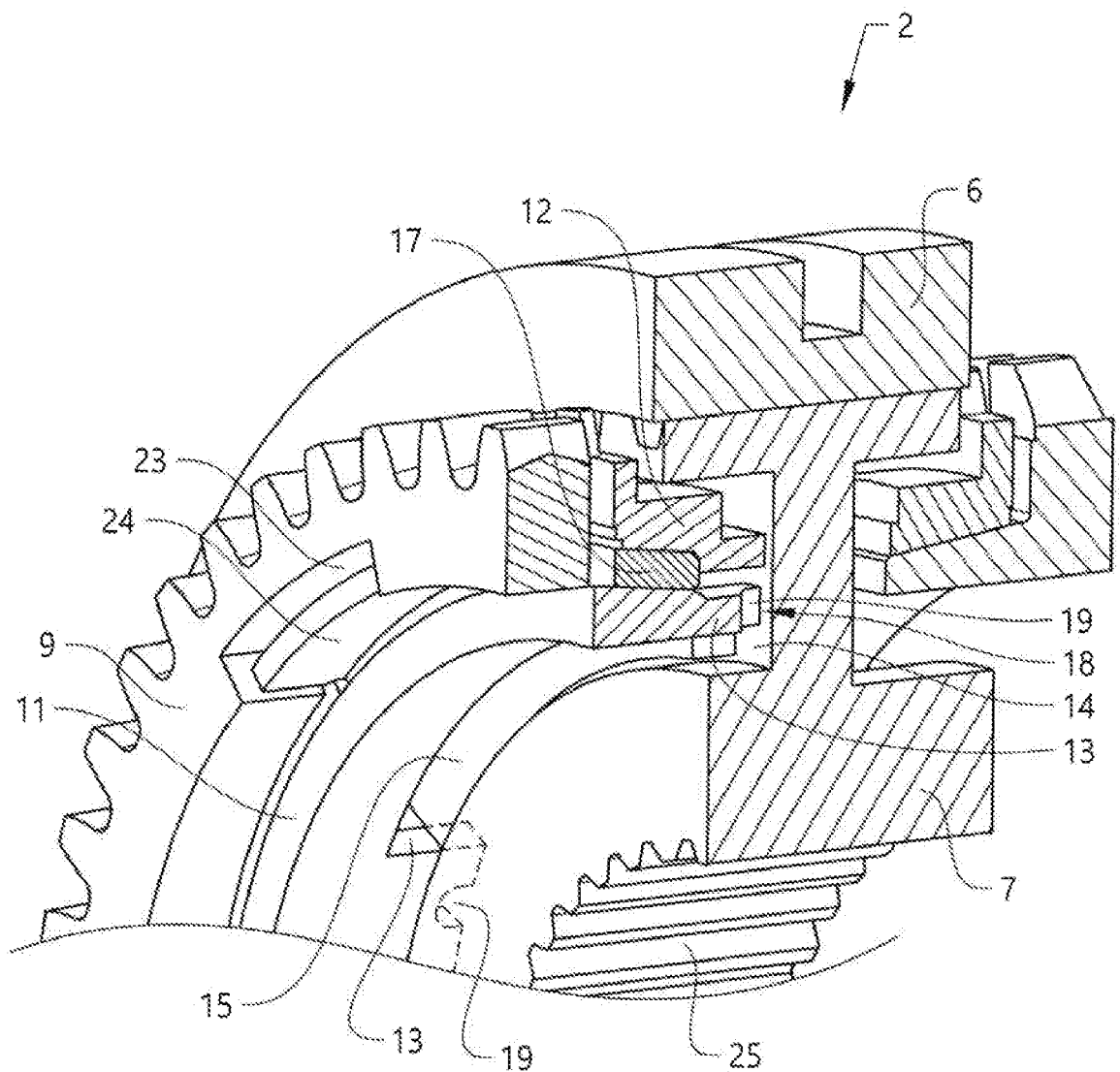
FIG. 2C is a perspective view of a part of the synchronizer in FIG. 1.

In the cut perspective view of the synchronizer 2 shown in FIG. 2C, the synchronizing ring 11 provided with the axial cam 13 with the axial surface 18 having the grooves 19 is illustrated. One axial cam 13 of the inner ring 11 received by a recess 14 of the further synchronizing ring 12 is illustrated on each side of the radial cam 15 of the further synchronizing ring 12. Further, a recess 23 of the dog ring 9 receiving an axial protrusion 24 of the intermediate ring 17 is shown. The hub 7 with splines 25 for connection to the shaft 5 and the sleeve 6 arranged on the hub 7 are also illustrated.

Figure 3A:
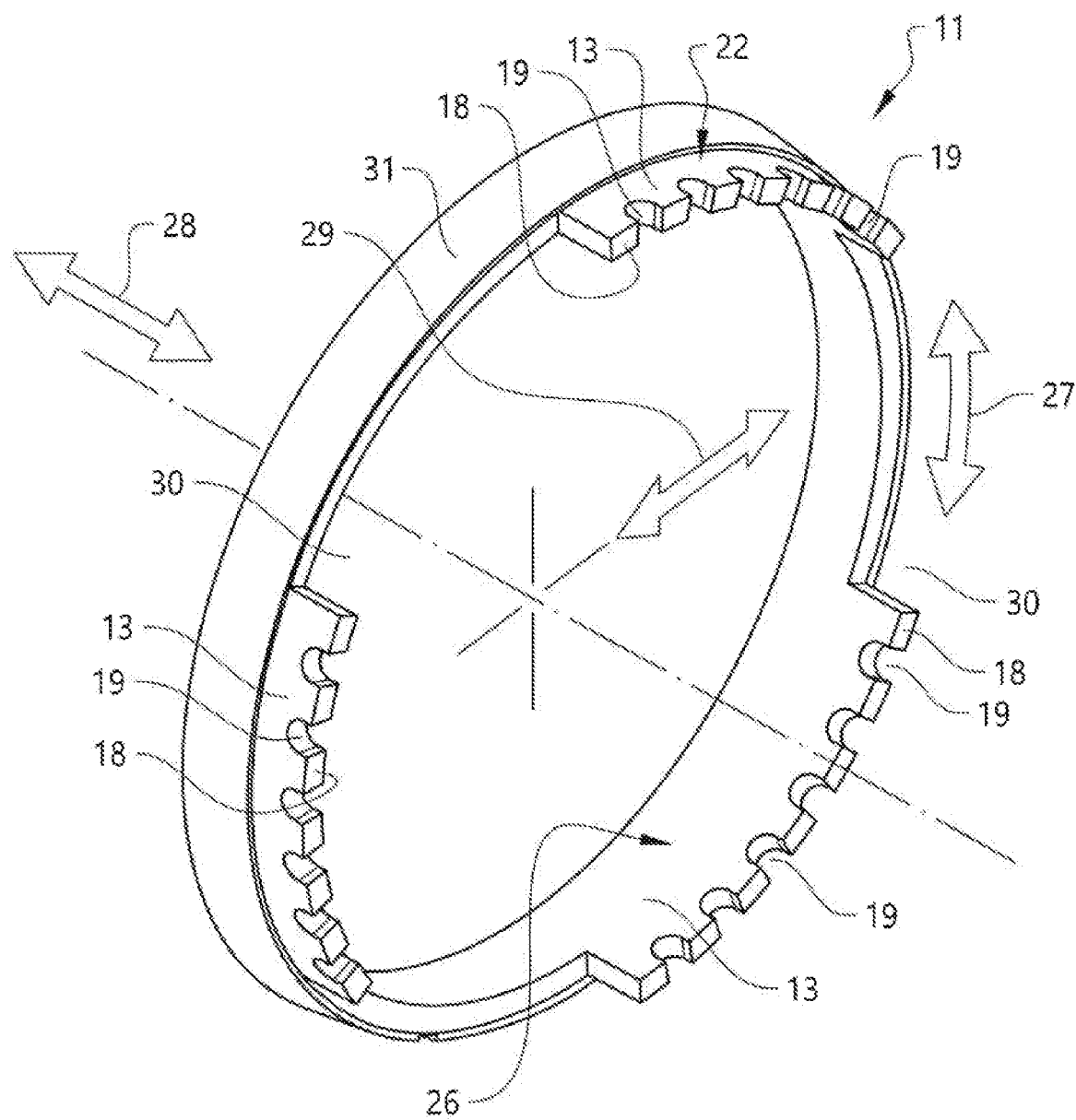
FIG. 3A is perspective view of a synchronizing ring.
Figure 3B:
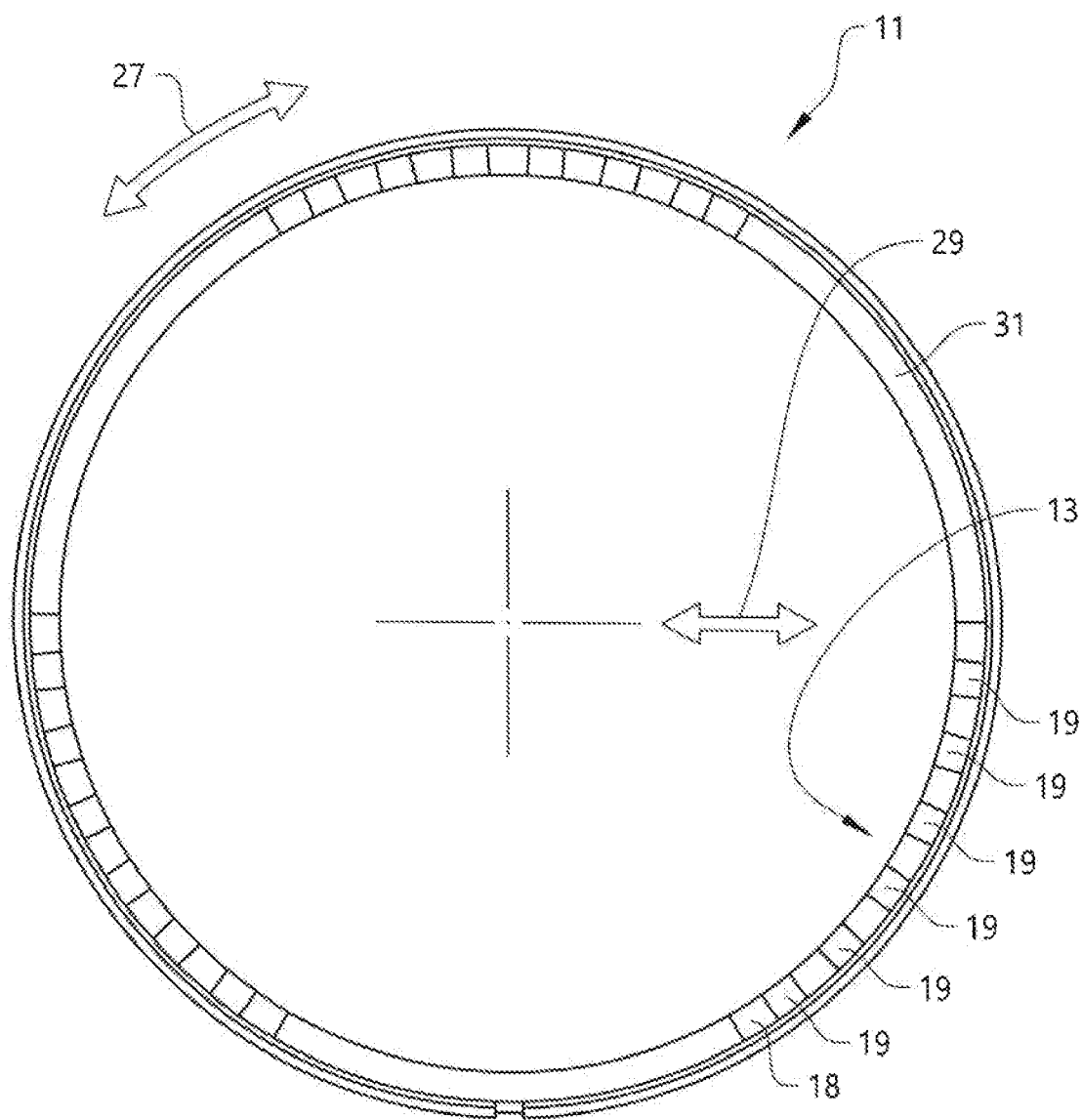
FIG. 3B is a front view of the synchronizing ring in FIG. 3A.
Figure 3C:
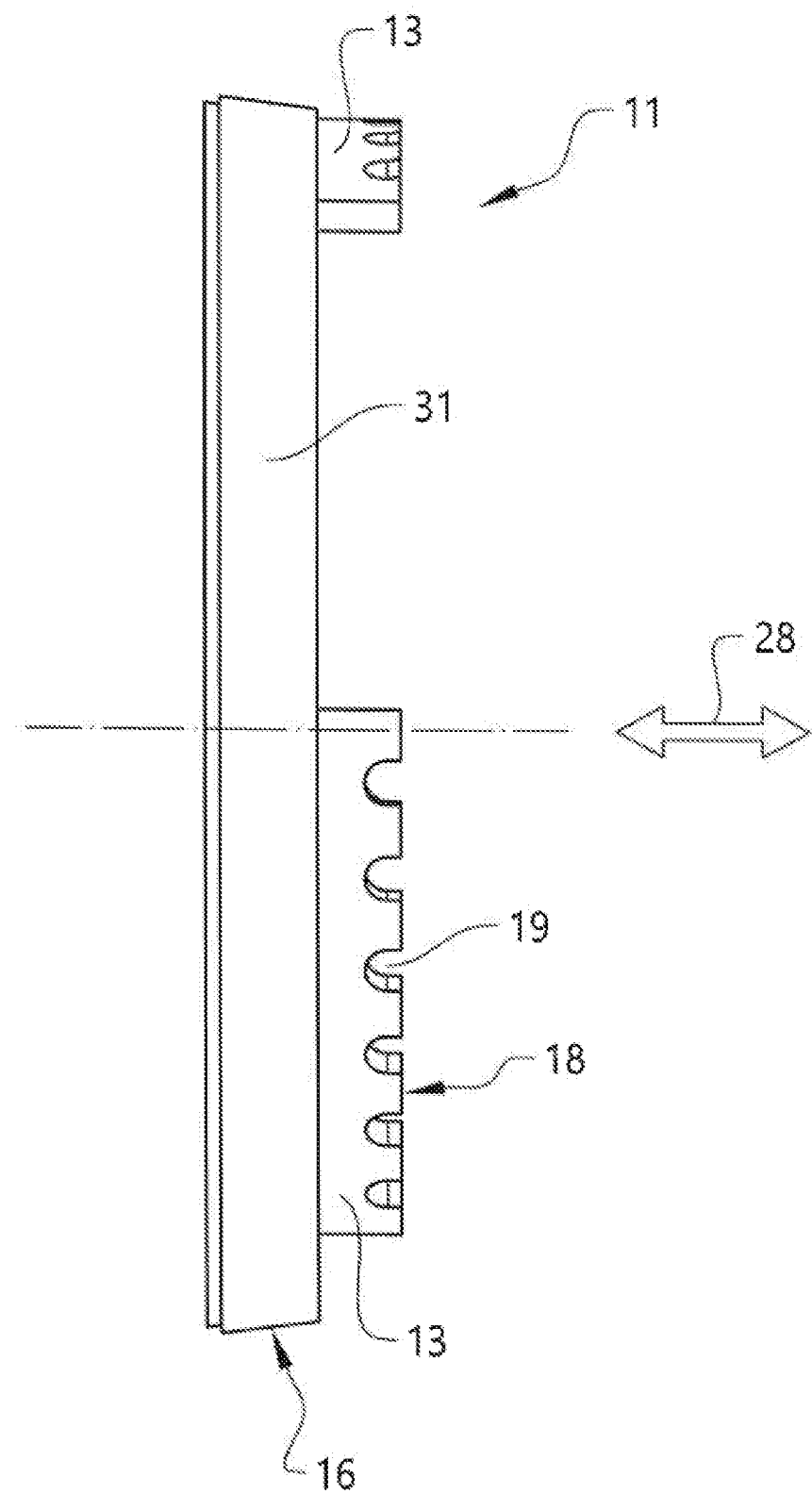
FIG. 3C is a side view of the synchronizing ring in FIG. 3A.

In FIGS. 3A, 3B and 3C the synchronizing ring 11 is illustrated more in detail. FIG. 3A is a perspective view of the synchronizing ring 11, FIG. 3B is a front view and FIG. 3C is a side view of the synchronizing ring 11.

FIG. 3A is a perspective view showing the axially extending cams 13 of the synchronizing ring 11. The synchronizing ring 11 has a ring portion 31 which is provided with the plurality of axial cams 13 for engagement with the further synchronizing ring 12 (see FIG. 1). The axial cams 13 are to be received by the corresponding recesses of the further synchronizing ring 12. The axial surface 18 of each axial cam 13 is provided with the plurality of grooves 19 for transportation of oil. The grooves 19 can be used for transportation of oil from the gap 20 formed between the axial surface 18 of each axial cam 13 and a component 7 of the synchronizer 2, such as the hub 7, when the synchronizing ring 11 is installed in the synchronizer 2.

Each axial cam 13 has suitably two main extension directions, one first main extension direction in a circumferential direction 27 of the synchronizing ring 11 and a second main extension direction in an axial direction 28 or longitudinal direction of the synchronizing ring 11. This direction is in parallel with the axial direction 8 of the synchronizer 2 when the synchronizing ring 11 is installed in the synchronizer 2. In addition, each axial cam 13 has a third extension direction or thickness in a radial direction 29 of the synchronizing ring 11. This direction is in parallel with a radial direction of the synchronizer 2 when the synchronizing ring 11 is installed in the synchronizer 2.

Each groove 19 can have a longitudinal extension direction in parallel with the radial extension direction 29 of the synchronizing ring 11. The length of each groove 19 is preferably equal to the extension of the axial cam 13 in the radial extension direction 29 of the synchronizing ring 11. Hereby, each groove forms a channel extending from one side of the cam to another side of the cam or in other words; from an outer radial surface 22 of the axial cam 13 to an inner radial surface 26 of the axial cam 13.

Although the example embodiment of the synchronizing ring 11 illustrated in FIG. 3A has three axial extending cams 13, the number of axial cams 13 (and corresponding recesses 30 therebetween) can of course be different for other synchronizing rings. The synchronizing ring 11 has preferably a number of axial cams 13 being a multiple of 3, and often the synchronizing ring 11 has a number of cams in the interval 3-9.

For an increased circumferential length and/or radial extension of the axial cams 13, the need of the grooves 19 will increase. Often the total circumferential length of the axial cams 13 and the thickness of the axial cams 13 have dimensions resulting in a not negligible area (defined by the axial surfaces 18 of the axial cams 13) where the axial cams 13 and the hub 7 overlap and thereby form the gap 20 (see FIG. 2A). For example, the total circumferential length of the axial cams 13 is often at least equal to the total circumferential length of the recesses 30 between the axial cams 13, and it has been found out that the grooves 19 can improve the lubrication to a significant extent.

Each axial cam 13 can have 2-20 grooves, preferably 3-10 grooves and more preferably 4-8 grooves. Of course, in addition to the number of grooves 19 also the size of the grooves, i.e. the cross-section dimensions, and the shape of the grooves, can be varied and adapted to the current application.

As illustrated in the example embodiment shown in FIGS. 3A, 3B and 3C, each axial cam 13 can have six grooves 19 arranged on the axial surface 18 where each groove 19 has a length corresponding to the radial extension or thickness of the axial cam 13, and each groove 19 has a semi-circular cross section.

The outside of the synchronizing ring 11 is suitably provided with a surface 16 for interacting with an intermediate ring 17 (see FIG. 1). This outer surface 16 of the ring portion 31 of the synchronizing ring 11 can be conical relative to the longitudinal extension direction 28 or axial direction of the synchronizing ring 11.

It is to be understood that the present invention is not limited to the embodiments described above and illustrated in the drawings; rather, the skilled person will recognize that many changes and modifications may be made within the scope of the appended claims.

What is claimed is:

1. A synchronizing ring for a synchronizer of a transmission, the synchronizing ring being provided with a plurality of axially extending cams for engagement with a further synchronizing ring, wherein an axial surface of each axial cam is provided with a plurality of grooves for transportation of oil.

2. A synchronizing ring according to claim 1, wherein each axial cam has 2-20 grooves.

3. A synchronizing ring according to claim 2, wherein each axial cam has 3-10 grooves.

4. A synchronizing ring according to claim 2, wherein each axial cam has 4-8 grooves.

5. A synchronizing ring according to claim 1, wherein each groove has an extension direction in the radial extension direction of the synchronizing ring.

6. A synchronizing ring according to claim 5, wherein the length of each groove is equal to the extension of the corresponding axial cam in the radial extension direction of the synchronizing ring.

7. A synchronizing ring according to claim 1, wherein the synchronizing ring has a number of axial cams being a multiple of 3.

8. A synchronizing ring according to claim 1, wherein the synchronizing ring has a number of axial cams in the interval 3-9.

9. A synchronizing ring according to claim 1, wherein the synchronizing ring is an inner ring.

10. A synchronizer for a vehicle transmission, the synchronizer comprising a synchronizing ring, a component and a further synchronizing ring, the synchronizing ring being provided with a plurality of axially extending cams received by a plurality of recesses of the further synchronizing ring, wherein an axial surface of each axial cam is provided with a plurality of grooves for transportation of oil from a gap formed between the axial surface of each axial cam and the component.

11. A synchronizer according to claim 10, wherein each groove has a longitudinal extension direction in the radial direction of the synchronizing ring.

12. A synchronizer according to claim 11, wherein the length of each groove is equal to the extension of the corresponding axial cam in the radial direction of the synchronizing ring.

13. A synchronizer according to claim 10, wherein the synchronizing ring is an inner ring arranged inside of the further synchronizing ring being an external ring.

14. A synchronizer according to claim 10, wherein said component is a hub of the synchronizer.

15. A synchronizer according to claim 10, wherein the synchronizer is a multi-cone synchronizer and the synchronizing ring is an inner ring of the synchronizer and the further synchronizing ring is a blocking ring of the synchronizer.

* * * * *